US006805371B2

(12) United States Patent
Meginniss, III et al.

(10) Patent No.: US 6,805,371 B2
(45) Date of Patent: Oct. 19, 2004

(54) TWO-SPEED WHEEL ASSEMBLY FOR MANUAL WHEELCHAIRS, WITH A QUICK-RELEASE MOUNTING CAPABILITY

(75) Inventors: Stephen M. Meginniss, III, Seattle, WA (US); Wendell G. Matas, Seattle, WA (US)

(73) Assignee: Magic Wheels, Inc, Seattle, WA (US)

( * ) Notice: Subject to any disclaimer, the term of this patent is extended or adjusted under 35 U.S.C. 154(b) by 0 days.

(21) Appl. No.: 09/954,576

(22) Filed: Sep. 14, 2001

(65) Prior Publication Data

US 2003/0052531 A1 Mar. 20, 2003

(51) Int. Cl.$^7$ .............................................. B62M 1/14
(52) U.S. Cl. .................. 280/250.1; 280/304.1
(58) Field of Search ...................... 280/250.1, 304.1, 280/236, 260; 301/6.1, 35.53, 125, 121, 122, 111; 74/552

(56) References Cited

U.S. PATENT DOCUMENTS

| | | | | |
|---|---|---|---|---|
| 3,563,568 A | * | 2/1971 | Sasse et al. ................... | 280/230 |
| 4,274,650 A | * | 6/1981 | Gilles ....................... | 280/250.1 |
| 4,679,862 A | * | 7/1987 | Luo ............................ | 301/112 |
| 5,160,156 A | * | 11/1992 | Mendon .................... | 280/250.1 |
| 5,362,081 A | * | 11/1994 | Beidler et al. ............ | 280/250.1 |
| 5,482,305 A | * | 1/1996 | Jeffries et al. ............ | 280/250.1 |
| 5,727,850 A | * | 3/1998 | Masclet ................. | 301/111.03 |
| 6,074,980 A | * | 6/2000 | Derleth et al. ............... | 502/214 |
| 6,203,041 B1 | * | 3/2001 | Helm ....................... | 280/250.1 |
| 2002/0036427 A1 | * | 3/2002 | Melgarejo et al. ...... | 301/111.06 |

FOREIGN PATENT DOCUMENTS

JP      6-165799     *   6/1994

* cited by examiner

*Primary Examiner*—Anne Marie Boehler
(74) *Attorney, Agent, or Firm*—Jensen & Puntigam, P.S.

(57) ABSTRACT

A wheel assembly for a wheelchair having a number of structural features, including a two-gear arrangement, in which one gear is a hypocycloidal gear providing a gear ratio lower than 1:1. A shift member is located on the wheel assembly with hand operated shift portions of the shift member, the shift member capable of moving laterally (perpendicular to the axle) of the wheel between two positions. The shift member can be moved by the user while seated in the wheelchair. The wheel assembly includes a hand rim which is connected to a housing within which is a gear assembly. The gear assembly includes two spaced cage plates which are joined by fixed shafts having unidirectional rollers positioned thereon around the periphery thereof. The rollers have an exterior surface portion which engages with the interior surface of the housing in such a way as to readily permit movement in the forward direction, but to prevent movement in the rear direction, unless the hand rims are used to rotate the housing relative to the gear assembly. The cage plate structure has rubbing elements which interact with the interior surface of the housing to produce an additional braking force for downhill terrain.

32 Claims, 10 Drawing Sheets

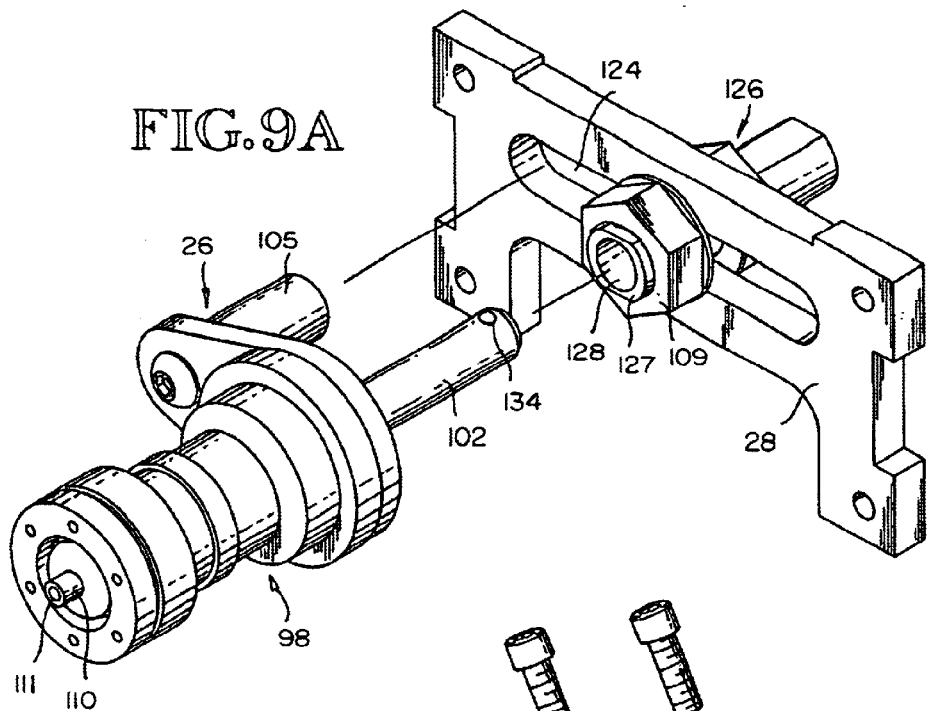
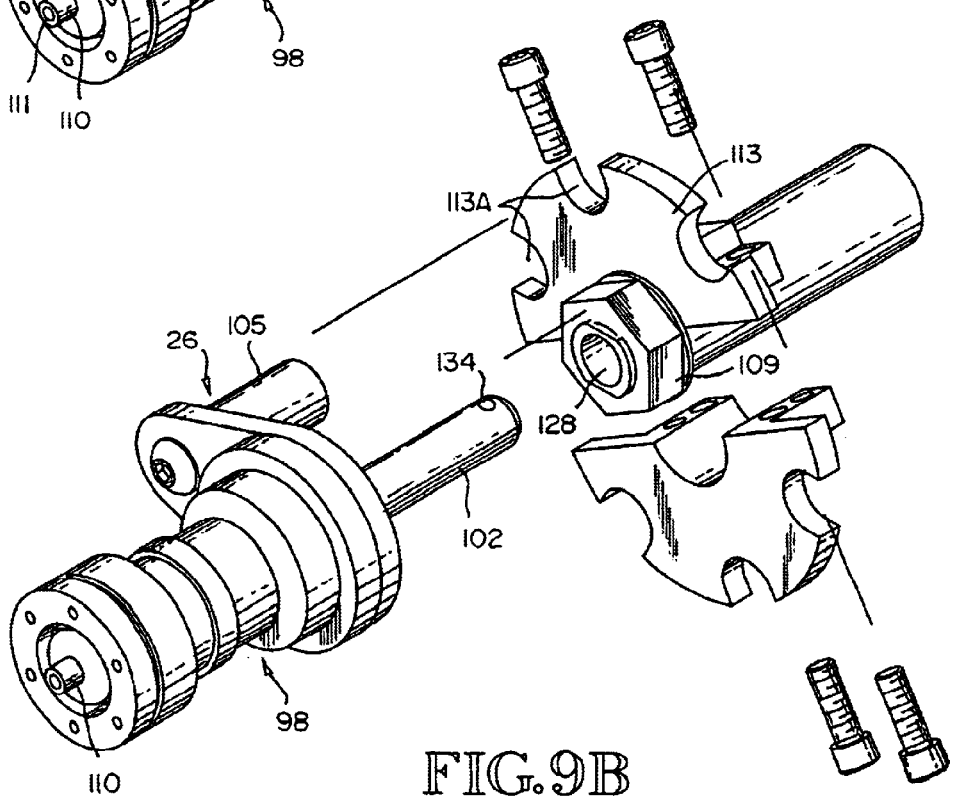

TWO-SPEED WHEEL ASSEMBLY FOR MANUAL WHEELCHAIRS, WITH A QUICK-RELEASE MOUNTING CAPABILITY

GOVERNMENT RIGHTS

This invention was made with government support under SBIR grants I R43 HD35793-01A1 and 2 R44 Hd35793-02, awarded by the U.S. Department of Health and Human Services, Public Health Service, National Institutes of Health. The government has certain rights in the invention.

TECHNICAL FIELD

This invention generally relates to manual wheelchairs, and more specifically concerns a new wheel assembly for a manual wheelchair.

BACKGROUND OF THE INVENTION

According to current statistics, there are more than 1.4 million full-time manual wheelchair users in the United States. The population of individuals using wheelchairs is currently estimated to grow at a rate of approximately 10 percent per year for at least the next several years. While reasons for using a wheelchair, and more specifically a manual wheelchair, vary significantly, manual wheelchair users typically have a lower extremity weakness, paralysis or, in some cases, amputation, which makes walking either impossible, unsafe or very difficult.

Causes of these lower extremity conditions vary widely, but include spinal cord injuries, hemiplegia and other types of paralysis, multiple sclerosis, cerebral palsy, spinal bifida, arthritis and lower limb amputations, among others. There are also several millions of people per year who are temporarily in wheelchairs for several weeks or more during recovery from injury, surgery or illness.

A user's success with a wheelchair, as well as their independence and, in particular, their community access, is significantly affected by their ability to self-propel the wheelchair. While some individuals with manual wheelchairs have access to personnel to propel a wheelchair on their behalf, it is usually desirable for the users themselves to be able to independently propel their wheelchair.

Interestingly, given the rapid acceleration of technology in many areas affecting modern life, including advances in assisting people with various disabilities in various ways, and significant advances in the areas of vision and hearing improvement, as well as development of various new medical procedures and equipment, there has been little change in the basic design of manual wheelchairs over the past 150–200 years.

With manual wheelchairs, the user propels, steers and brakes the wheelchair by either pushing against or grasping a hand rim portion (also known as a push rim) of the wheelchair. The hand rim is structurally connected to the wheelchair wheel, which in turn contacts the ground. Typically, the user must apply a relatively large force to accomplish many conventional wheelchair actions. Those actions may result in various acute and chronic arm and shoulder repetitive stress injuries. For instance, shoulder-related injuries have been shown to afflict up to 51 percent of manual wheelchair users, while elbow, wrist and hand injuries and pain are also widely noted. Some injuries/conditions, while generally regarded as minor, are still painful, such as blisters and calluses on the user's hands, due to sliding friction between the hand rim and the user's hands (especially during extended braking).

Various environmental conditions can accentuate or even cause such injuries, including poor or uneven terrain or surfaces affected by inclement conditions such as rain, snow and ice, as well as cold or slippery hand rims. In many cases, the incidence of such injuries to an otherwise healthy (albeit incapacitated) user can hasten the time of transition to a powered wheelchair or the necessity of an attendant. An attendant is generally undesirable, as independence is usually highly valued by wheelchair users and results in reduction of already scarce resources.

A number of attempts have been made in the past to improve manual wheelchair performance and decrease the burden on the user in his/her use of the wheelchair. These include two-speed or multi-speed wheelchairs, such as shown in U.S. Pat. Nos. 5,482,305 and 5,160,156, among others. Various drive mechanisms are known, including arm cranking systems such as shown in U.S. Pat. Nos. 5,037,120 and 4,506,901, in which cranks and gears similar to a bicycle are mounted in front of the rider and are turned by the hands to propel and brake the wheelchair. Another system uses a central planetary gear drive, such as shown in U.S. Pat. Nos. 5,486,016 and 5,362,081, while lever drives, such as shown in U.S. Pat. Nos. 4,682,783, 5,941,547 and 5,322,312, are also known. A more recent development is known as the electrical assist manual wheelchair wheel. However, these designs and features and others like them suffer from various disadvantages, including expense, inconvenience, substantial additional weight and difficulty of installation on existing wheelchairs.

Also, while there are numerous patents involving various wheelchair braking systems, no system has a successful automatic (and readily overridable) "holding" action as a wheelchair is being pushed up a hill, to prevent the wheelchair from rolling backwards as a user advances his grip on the hand rim. Reliable, mechanically efficient braking for downhill movement has also been a troublesome and challenging issue for wheelchair designers. A bicycle-type coaster brake for wheelchairs is known (U.S. Pat. No. 5,160,156), but it does not have hill-holding capability.

Hence, several aspects of a manual wheelchair are in need of improvement, including better multi-gear arrangements, better gear shifting arrangements, a holding capability for uphill movement and better braking for downhill movement, with such improvements being capable of easy installation on existing wheelchairs. Some of these needed improvements apply to powered wheelchairs or wheelchairs using power assist wheelchair wheels as well.

DISCLOSURE OF THE INVENTION

Accordingly, the present invention is a two-speed drive mechanism for a wheelchair, comprising: a wheelchair wheel; a hand rim which permits a user to drive the wheelchair wheel; a gear assembly which includes a first gear arrangement for driving the wheelchair in a first, 1:1 gear ratio, and a second, hypocycloidal gear arrangement for driving the wheel in a second, lower gear ratio than 1:1; a support assembly for mechanically linking the hand rim and the gear assembly; and means for shifting between the two gear arrangements.

BRIEF DESCRIPTION OF THE DRAWINGS

FIG. 9A is an exploded view showing a quick-disconnect attachment for a multi-speed drive wheel assembly to a wheelchair chassis having an axle plate-type wheel mounting.

FIG. 9B shows an attachment for a camber tube type wheel mounting.

BEST MODE FOR CARRYING OUT THE INVENTION

Figure 1:
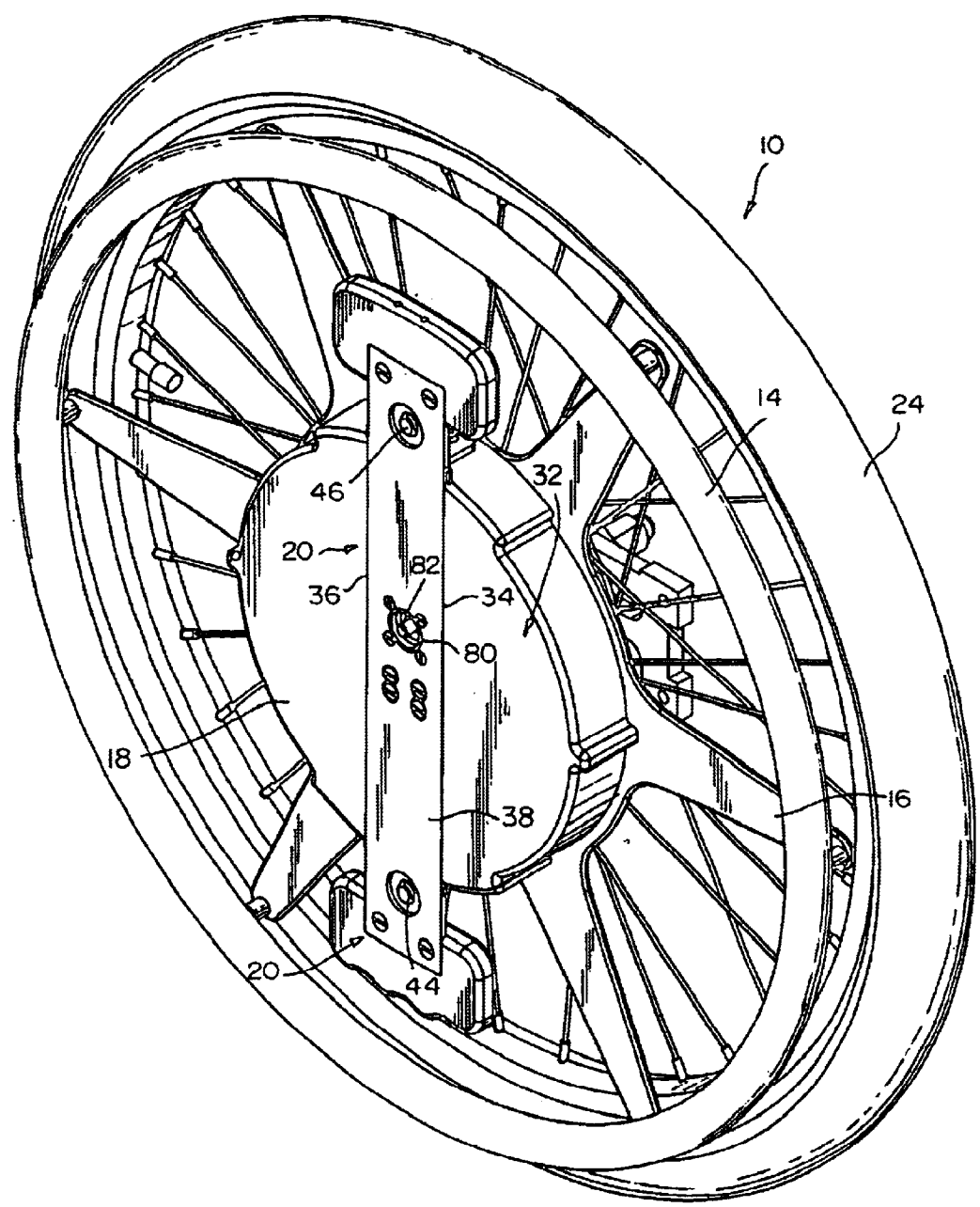
FIG. 1 is a perspective view showing the new manual wheelchair wheel assembly of the present invention.
Figure 2:
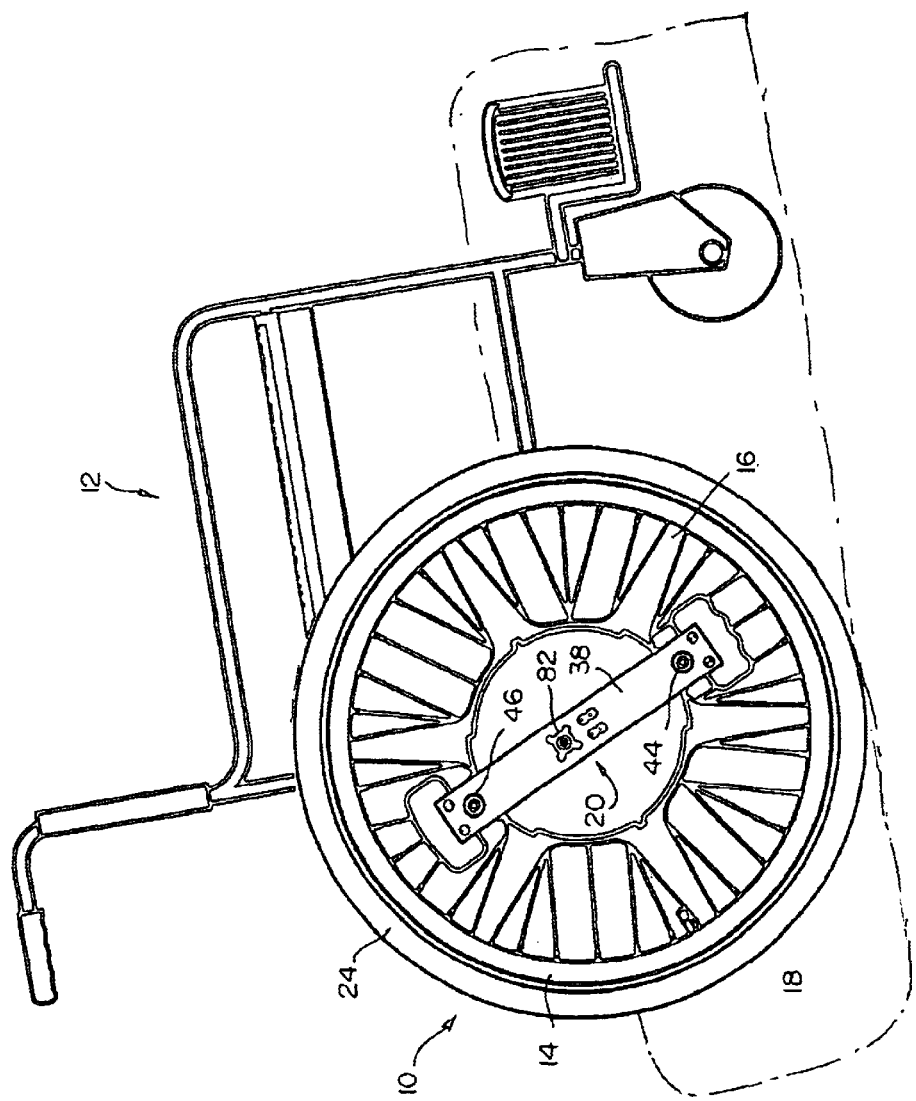
FIG. 2 is a perspective view showing the manual wheelchair wheel assembly of FIG. 1 in place on a conventional wheelchair.
Figure 3:
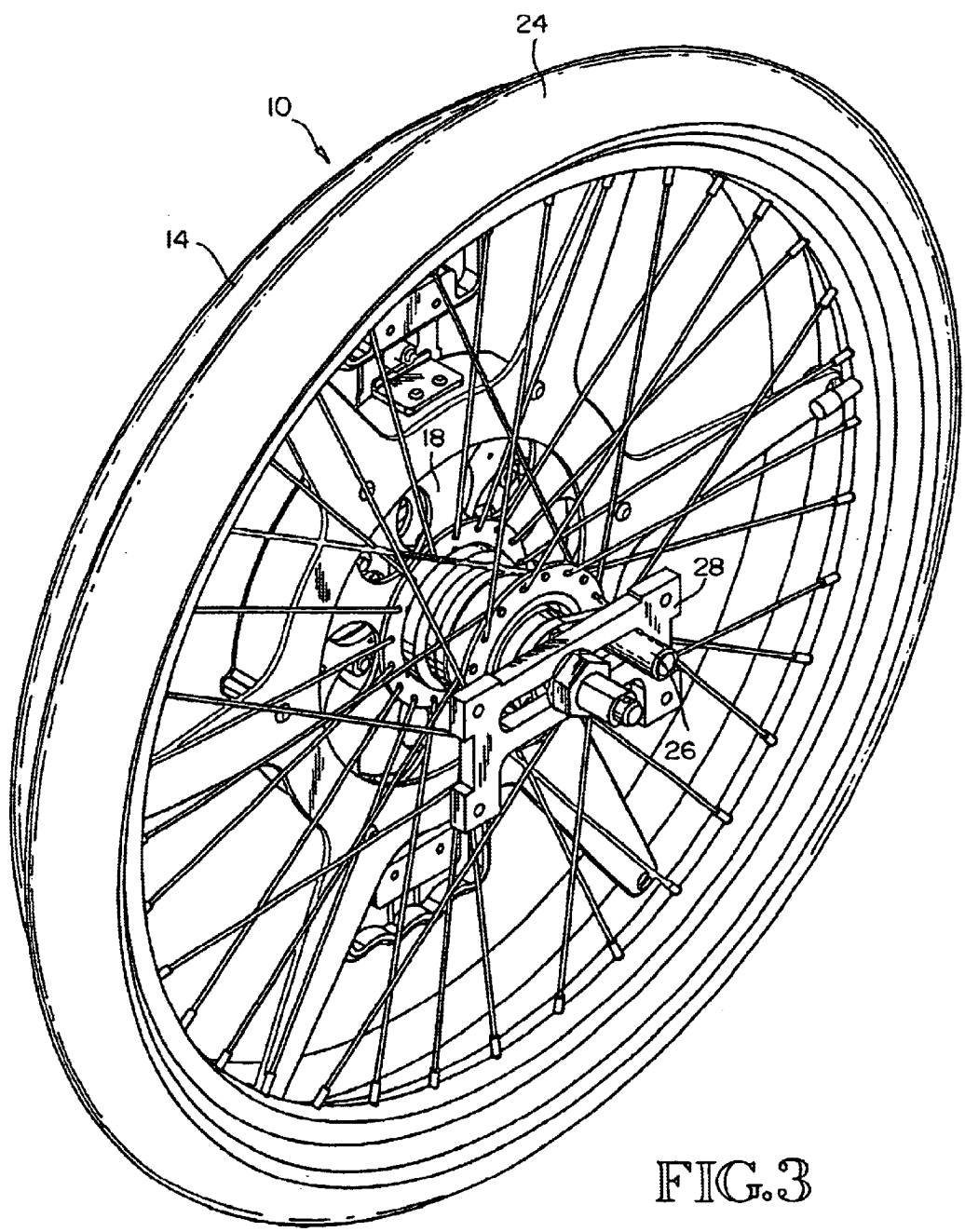
FIG. 3 is a rear perspective view of the wheelchair wheel assembly of the present invention.

FIGS. 1 and 3 are front and rear perspective views of the manual wheelchair wheel assembly of the present invention, while FIG. 2 shows the wheel assembly installed on a conventional manual wheelchair. The wheel assembly is shown generally at 10, while the wheelchair itself is shown generally at 12. Wheel assembly 10 includes a hand rim 14 from which extends inwardly a multi-spoked drive wheel 16, which is connected to a housing member 18.

A wheel-mounted shift mechanism 20 is positioned on housing 18. Shift mechanism 20 is connected to an internal gear assembly, not shown in FIGS. 1 and 3, which connects to a wheel 24, which contacts the ground. The wheel assembly 10 includes an axle and anti-rotation mounting assembly 26, which is mountable on an existing conventional fixed axle-receiving support assembly 28, which is fixedly secured to the frame of the wheelchair. The wheel assembly 10 is designed to have a quick-release capability from a bushing mounted on the axle-receiving support assembly 28 or in the end of a conventional camber tube arrangement.

In the embodiment shown, hand rim 14 is conventional, comprising a ¾-inch to one-inch diameter curved metal tube, which may be bare metal or coated with rubber or plastic to increase friction, the hand rim 14 being approximately 22 inches in diameter for a 24-inch wheelchair tire. Other hand rim sizes and configurations are available. The above dimensions may, of course, vary, depending on the particular wheelchair. Connected to the inner portion of hand rim 14 are the outboard ends of the spokes of drive wheel 16. Spoked drive wheel 16 has a central circular opening 19, approximately seven inches in diameter in the embodiment shown. Drive wheel 16 is secured to housing 18 near the peripheral edge of the inner surface of the housing, by fasteners 85 (FIG. 4), so that there is a rigid connection between them.

Housing 18 in the embodiment shown is approximately 1⅜ inches deep and has an inside diameter of approximately 9 inches. Enclosed within housing 18 is a gear assembly, which is shown in detail in FIGS. 4, 5 and 6. Mounted in the exterior wall 32 of housing 18 is the shift mechanism 20. The longitudinal edges 34 and 36 of a shift bar portion 38 of the shift mechanism 20 are dovetailed into mating edges of the exterior wall 32 of housing 18, so that shift bar 38 can move back and forth laterally (planar, perpendicular to the wheelchair axle), but is otherwise constrained in exterior wall 32. Shift mechanism 20 is designed to move laterally a short distance, approximately ⅛ inch, back and forth in the planar direction. Other shift mechanisms which move in the planar direction are also possible.

Figure 4:
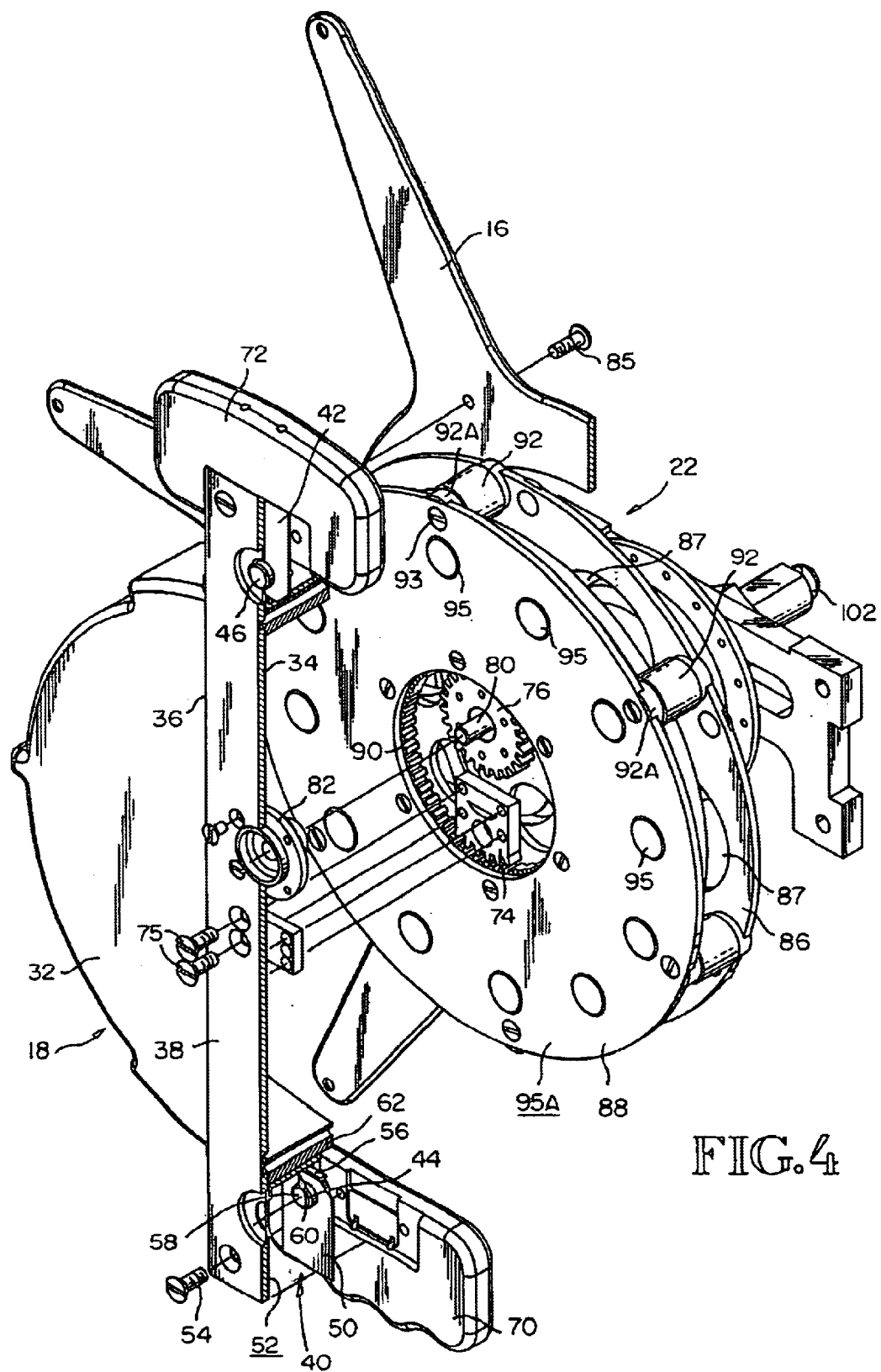
FIG. 4 is a partially exploded, partially cut-away view of the manual wheelchair wheel assembly of the present invention.

At each longitudinal end of shift bar 38 are locking mechanisms 40 and 42, operated by button elements 44 and 46. Referring to FIG. 4, locking mechanism 40, for instance, is exemplary and includes a small, flexible plate 50, which is secured by clamping action to inner surface 52 of shift bar 38 by means of a screw 54. When the shift bar is in one position, a small ear portion 56 abuts an edge 58 of an L-shaped locking plate 60 secured to the exterior edge surface of housing 18. This arrangement prevents shift bar 38 from moving, so that it stays in the one position. When the handle 72 with the smooth edge is pushed toward the center of the gear assembly, the wheel assembly is in a 1:1, flat terrain, gear ratio; when handle 70, with the wavy edge, is pushed toward the center, the wheel assembly is in a lower (less than 1:1), hill climbing, gear ratio.

When the wheel assembly is to be shifted from the 1:1 gear into the other, lower, gear, button 44 is pushed inwardly, releasing edge 56 of the flexible plate 50 from ear 58, permitting the shift bar 38 to be moved upwardly, by pushing on the wavy edge handle 70, until edge 56 contacts the other portion 62 of plate 60. This position of the shift mechanism (the lower gear position) is shown in FIG. 4. To move the shift bar into the 1:1 (higher) position, button 46 is pushed, releasing lock 42. The shift bar is then moved until ear 56 on plate 50 snaps against edge 58 of locking plate 60. In this position, the ear portion of the flexible plate in locking mechanism 42 is against the other portion of its associated locking plate (at the top end of bar 38 in FIG. 4).

Hence, shifting between two gears in the present invention is accomplished by moving shift bar 38 laterally (perpendicular to the axle of the wheelchair) back and forth across the surface of housing 18, with each shift requiring that a selected one of the locking plate buttons be pressed inwardly and the shift bar moved in the desired direction. Handles 70 and 72, as indicated above, are provided at the opposing ends of shift bar 38 to assist in the action of the shift mechanism 20 and to assist the user in identifying the correct handle to use to shift to a desired gear.

In the embodiment shown, the edges of handles 70, 72 have a different curvature, i.e. configuration (smooth for a 1:1 gear ratio, identifying the gear ratio for a flat terrain, and wavy for the lower gear ratio, for a hilly terrain). Again, this assists the user in quickly identifying the correct handle for a shift to a desired gear. The handles or other portions of the shift bar or other shift mechanism can differ in shape, edge configuration, texture or other physical quality. It is desirable that a user be able to distinguish between the two portions while wearing gloves. Button 44 or 46 is pushed at the same time pressure is applied to the handle portion associated with the button being pushed to accomplish a shift in gears. This arrangement has the advantage of the shift mechanism being completely contained on the wheel and readily accessible to the user, with shifting occurring by pressing the correct button and then moving the shift bar from its existing position to the other position. No part of the shifting mechanism is on the wheelchair chassis. In a variation of the above arrangement, the shift mechanism could be designed to self-lock in each gear position, for the benefit of users who are unable to operate the buttons on the shift bar.

The outer portion of the gear assembly for the wheel assembly is shown in FIG. 4. The present invention includes two gears, one with a 1:1 gear ratio and the other a lower gear ratio. A 2:1 gear ratio is possible, as are other lower gear ratios, depending on the number of teeth on selected gear portions of the gear assembly, as discussed in detail below. The 1:1 gear ratio is accomplished through a gear segment 74 which is fixedly secured to the interior surface of shift bar 38 by means of several screws 75 (or other elements), two of which are shown in FIG. 4. The lower gear ratio (less than 1:1) is accomplished through a round spur gear 76, which is eccentrically mounted within the gear assembly and driven in a hypocycloidal manner, as discussed in more detail below.

Extending through an open center of spur gear 76 is a button shaft member 80 which also extends through a short hollow spur gear drive shaft 82 mounted in shift bar 38 by means of screws 77 or the like. The free end of button 80 protrudes through hollow drive shaft 82 and hence is accessible to the user. Pressing button 80 inwardly produces a "quick release" action of the wheel assembly, as discussed below.

In one operating position of shift bar 38, gear segment 74 is engaged with ring gear 90 to produce a turning of the wheelchair wheel 24 in a 1:1 gear ratio, while when shift bar 38 is in its other operative position (the lower gear, less than 1:1), gear segment 74 is out of engagement with ring gear 90 and spur gear 76 is engaged with ring gear 90, producing a turning of wheel 24 in the second (lower) gear ratio. Moving the shift bar back and forth engages one gear or the other.

Figure 7C:
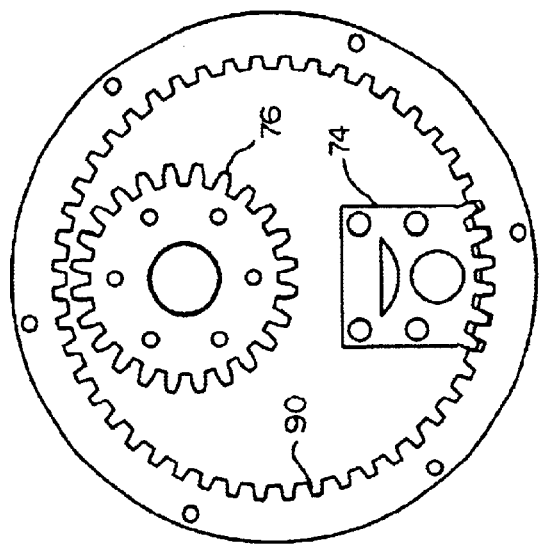
FIGS. 7A, 7B and 7C are front views showing a portion of the gear shifting system for the manual wheelchair wheel assembly of the present invention.
Figure 7B:
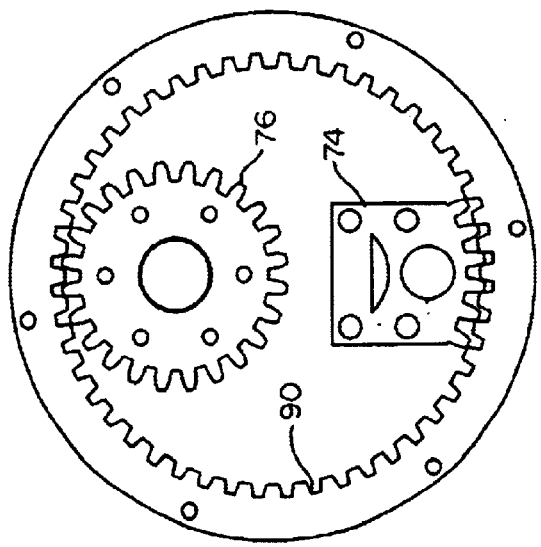
Figure 7A:
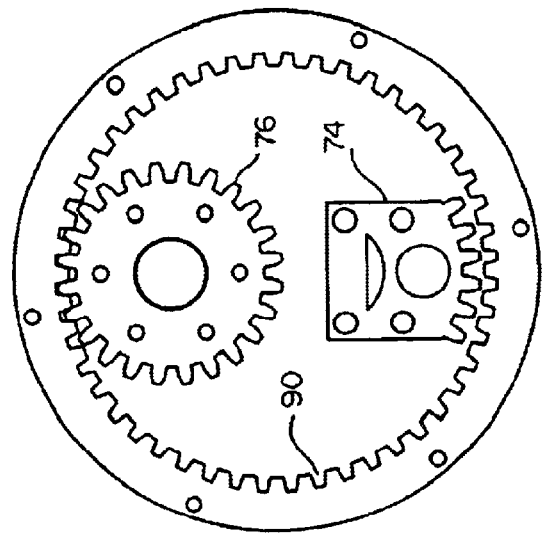

FIGS. 7A–7C show in detail the three positions of the gears during shifting. FIG. 7A shows the lower (less than 1:1) gear ratio position and FIG. 7C shows the 1:1 gear ratio position with fixed gear segment 74 engaged with ring gear 90. FIG. 7B shows an intermediate (transitional) gear position as the gears move between the 1:1 gear ratio and the lower gear ratio. In the intermediate gear position, spur gear 76 and gear segment 74 are simultaneously engaging the teeth of ring gear 90, which requires that the wheel be stationary during shifting, known as "make-before-break" shifting. Such a shifting process is an important feature, as it prevents the hand rim from becoming disconnected from the wheel tire during incomplete shifting of gears and also requires that the wheelchair be stopped and the load removed from the gear assembly before shifting, which prevents on-the-fly shifting.

Figure 5:
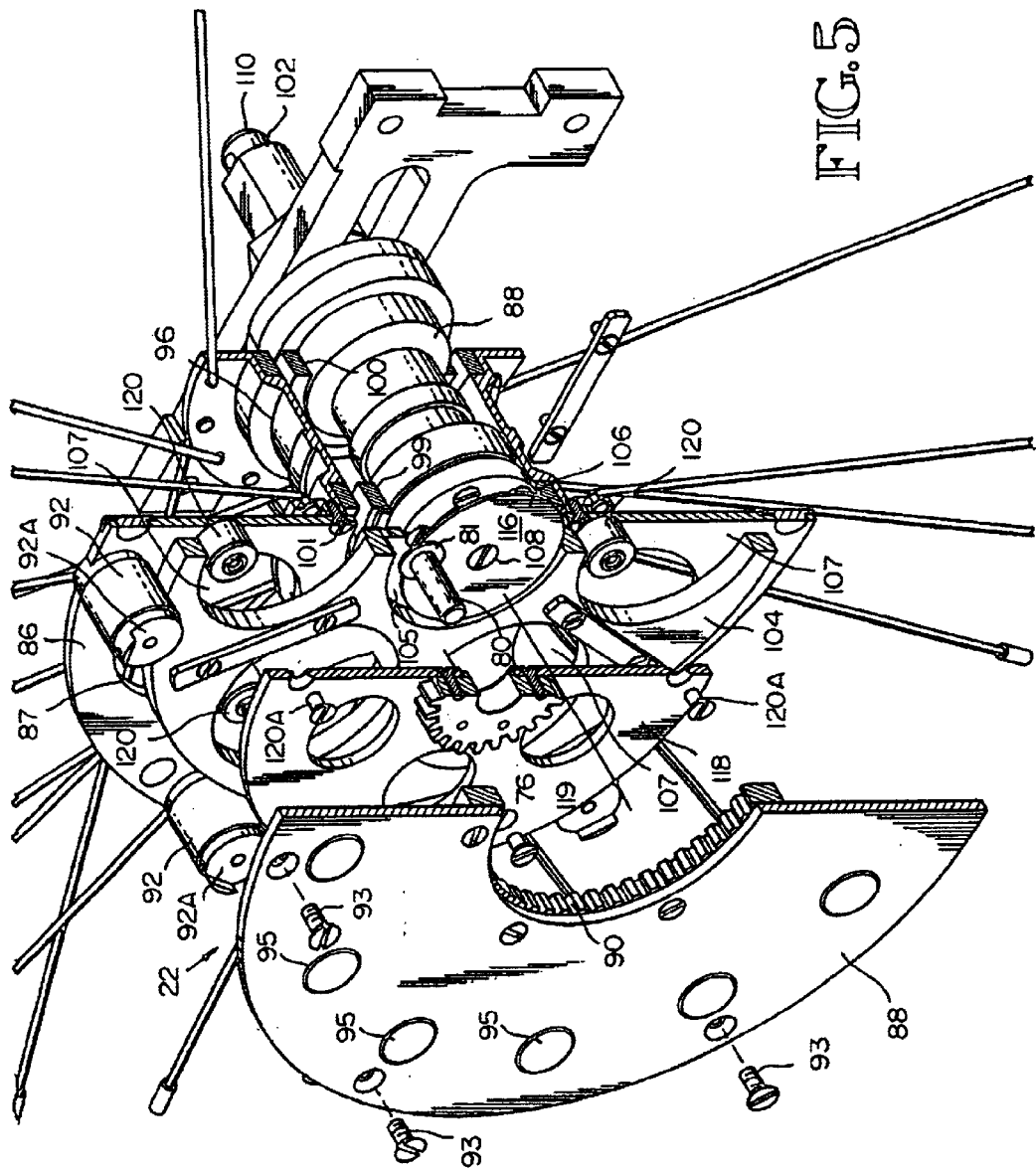
FIG. 5 is another partially exploded, partially cut-away view of the manual wheelchair wheel assembly of the present invention, showing portions of the wheel assembly generally interior of the portions shown in FIG. 4.

Referring now to FIGS. 4 and 5, the gear assembly 22, which connects hand rim 14 to the wheel 24 through drive wheel 16, housing 18 and shift mechanism 20, is shown. The gear assembly includes inner and outer spaced cage plates 86 and 88. In the embodiment shown, cage plates 86 and 88 are approximately 8½ inches in diameter. Outer cage plate 88 includes ring gear 90 in the center thereof. In the embodiment shown, ring gear 90 is approximately 3 inches in diameter and has approximately 36 teeth.

Inner and outer cage plates 86 and 88 are connected by a plurality of fixed shafts 92A—92A which are an inside part of roller assemblies 92—92, located at the peripheries of plates 86, 88. In the embodiment shown, roller assemblies 92 are approximately 1 inch long, resulting in the inner and outer cage plates being separated by approximately that same distance. Roller assemblies 92 include a one-way clutch so that they roll on the fixed shafts 92A in one direction (the forward direction), but not the other direction (the reverse direction). Shafts 92A—92A of roller assemblies 92—92 are connected to the cage plates by conventional screws 93—93 or similar means. In the embodiment shown, there are six equally spaced roller assemblies, although there could be more. There could also be fewer roller assemblies; however, there must be at least three such roller assemblies to accomplish the wheelchair "hold" function discussed below.

The cage plates 86, 88, are rotatable relative to housing 18 and spoked drive wheel 16. Housing 18 and drive wheel 16 are assembled around cage plates 86, 88, with the exterior surface of roller assemblies 92—92 and rub pads 95—95 (on surface 95A of plate 88) bearing against the inside surfaces of the housing, producing a frictional relationship which is important to the operation of the wheelchair, as explained in more detail below.

Either gear segment 74 or spur gear 76 mates with ring gear 90, depending upon the position of the shift mechanism, to provide a turning action to the inner and outer joined cage plates (joined by roller assemblies 92). As discussed above, when the shift mechanism is in a first position (a 1:1 gear ratio), gear segment 74, mounted to shift bar 38, mates with ring gear 90 in a rotational arrangement; while when the shift mechanism is in its second position (a lower gear ratio), spur gear 76 is engaged with ring gear 90, in a hypocycloidal orbiting arrangement.

Inner cage plate 86 is fixed to an outer wheel hub portion 96 of the wheel assembly, which is the actual hub of wheel 24. Hub portion 96 is mounted for rotation on an axle hub 98. Circular bearings 99 and 100 separate the inner surface of wheel hub 96 from the outer surface of axle hub 98. Inner cage plate 86 is mounted to the outer end surface of wheel hub 96, near the inner peripheral edge of wheel hub 96 by means of screws 101 or similar attachment means. Hence, rotation of the inner and outer cage plates 86 and 88, secured together, results in the rotation of wheel 24, which rides on bearings 99 and 100 about fixed axle hub 98. There is thus a complete physical connection between hand rim 14 and wheel 24, through gear assembly 22.

Figure 6:
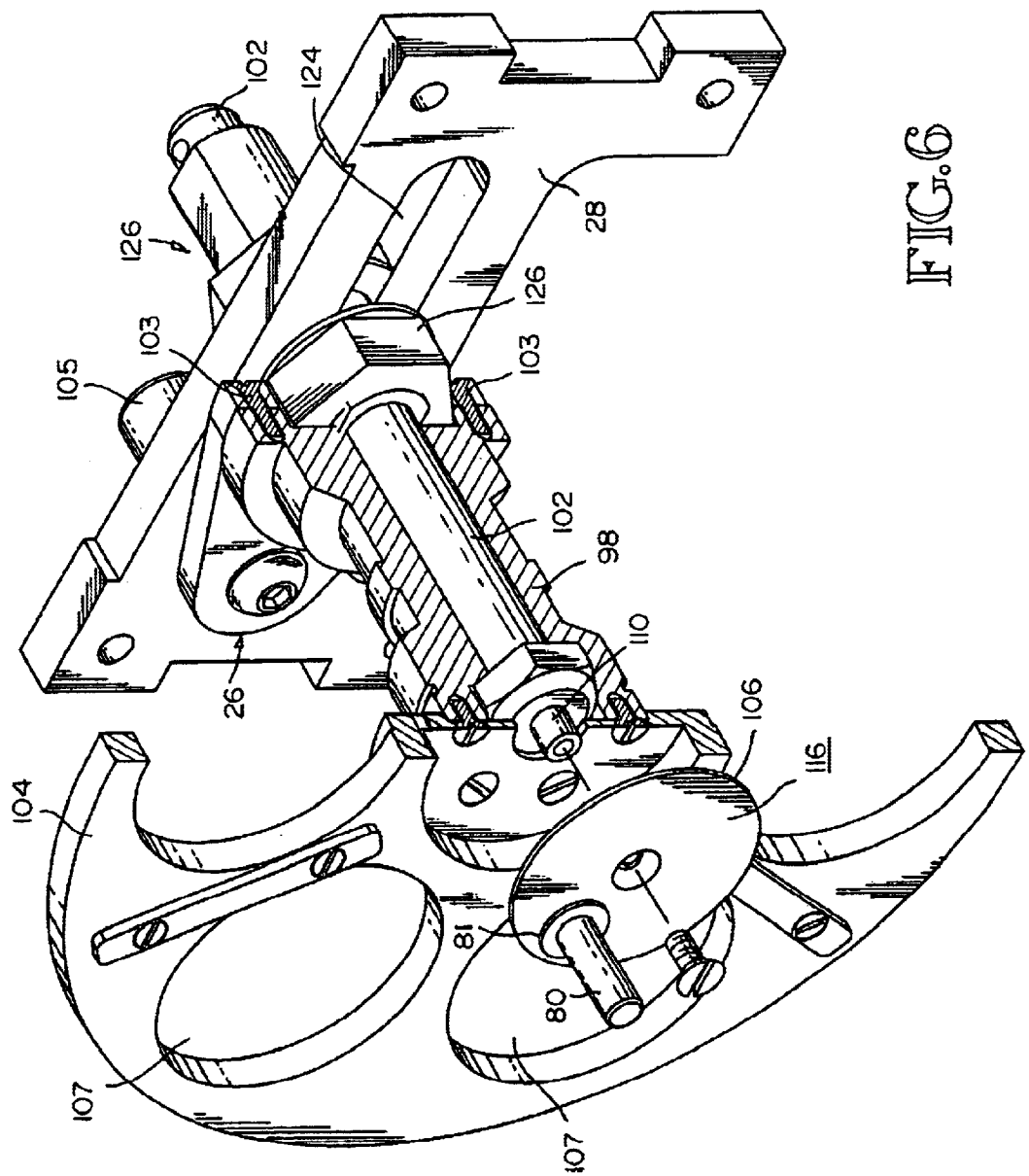
FIG. 6 is a perspective, partially cutaway view showing portions of the wheelchair generally interior of the portions shown in FIG. 5, including the attachment of the wheel assembly to a wheelchair.

Referring to FIG. 6, axle hub 98 does not rotate, but remains fixed. Axle hub 98 is hollow and extending therethrough is a conventional wheelchair "quick release" cylindrical axle 102. Secured to the outer end surface of axle hub 98 is a hypocycloidal, non-rotating stator plate 104. This plate 104 is positioned between cage plates 86 and 88 and remains fixed because axle hub 98 remains fixed. Non-rotating stator plate 104 is circular and has a diameter of approximately seven inches in the embodiment shown. It includes, in the embodiment shown, six circular openings 107 precisely equally spaced around the plate. The number of openings may vary, but a minimum of three is required. In the embodiment shown, each of these circular openings is approximately 2 inches in diameter. As indicated above, stator plate 104 is connected to the end surface of axle hub 98, and hence does not rotate.

Located centrally of stator plate 104 is a circular depression 105 within which screws (or other fasteners) connect stator plate 104 to the axle hub 98. Positioned in this depression is a circular disc 106 which is secured by a screw 108 (or other means) to an end 109 of a spring-loaded cylinder 110, which extends laterally through axle 102 on which axle hub 98 is mounted, as shown in FIGS. 6 and 9. Cylindrical button 80 is positioned so that its base portion 81 is positioned adjacent outer surface 116 of disc 106, but is not attached thereto, i.e. it is free to move about surface 116. Button 80 extends through a central opening 119 in spur gear 76 and then through hollow drive shaft 82 which is secured to shift bar 38.

Spur gear 76 is secured to an eccentrically moving restraint plate 118 (FIG. 5). In the embodiment shown, restraint plate 118 is positioned between non-rotating stator plate 104 and outer cage plate 88. It is not fixedly secured to any other portion of the gear mechanism 22, but does include a series of spaced roller elements 120 attached thereto by screws 120A, or other means which extend inwardly toward the chassis from a surface of restraint plate 118. Rollers 120 each mate with and are confined by an associated circular opening 107 in non-rotating stator plate 104. Hence, restraint plate 118 is free to orbit in an eccentric (hypocycloidal) fashion, determined by the path of rollers 120 moving around the periphery of openings 107 in the non-rotating stator plate 104. This comprises the hypocycloidal restraint mechanism for spur gear 76 in the lower gear position. The hypocycloidal restraint only functions when spur gear 76 is shifted into the lower gear position, where the eccentricity of the hollow drive shaft 82 brings rollers 120—120 simultaneously into contact with the peripheries of their associated openings 107—107.

Spur gear 76 thus orbits (but does not rotate) about an eccentric axis, engaging ring gear 90 when the shift mechanism is in the correct position for that gear ratio. The arrangement results in what is known as a hypocycloidal action of spur gear 76 and ring gear 90. Spur gear 76 has approximately one-half the number of teeth as ring gear 90 and thus produces a lower gear action (less than 1:1) between hand rim 14 and wheel 24, i.e. in the embodiment shown a 2:1 ratio, two revolutions of hand rim 14 resulting in one revolution of wheel 24.

Hypocycloidal gear action is per se known, but it has not been heretofore used in a wheelchair gear mechanism and not with a gear ratio lower than approximately 3:1, since usually, the hypocycloidal mechanism is internal to the spur gear, resulting in a higher ratio. The specific arrangement of the embodiment of the present invention is therefore important. Because of the particular structural arrangement of the embodiment shown, involving a non-rotating stator plate 104 with circular openings and an orbiting restraining plate 118 with extending rollers 120 which mate with the openings in the non-rotating plate, a small spur gear can be used with a larger diameter hypocycloidal restraint plate, i.e. the restraint plate can be bigger than the spur gear. This is an advantage of the particular structure of the hypocycloidal gear system of the present invention, because the gear system can be shaped to fit inside a large diameter, but relatively thin, wheelchair wheel. As discussed above, the hypocycloidal gear arrangement, when orbiting spur gear 76 engages ring gear 90, produces a convenient lower gear (less than 1:1) function, while when gear segment 74 is engaged with ring gear 90, a 1:1 gear function results.

When the wheelchair is in its 1:1 gear, the wheelchair functions substantially like a conventional wheelchair, with minimum backlash (lost motion), as the hand rim is moved during maneuvering of the wheelchair. However, when the wheelchair is in its lower gear ratio, using the hypocycloidal gearing arrangement, several advantages are realized from roller assembly elements 92—92, which are arranged and positioned to interact physically with the interior surface 97 of housing 18. As discussed above, roller assemblies 92 are one-way roller assemblies (they include single direction roller clutches) such that they rotate in one direction but not the other.

Further, the roller assemblies may have aluminum (or other material) "tires" 92B with a smooth, sculpted or treated (anodized) surface (similar to auto tires), which provides desirable frictional contact with the interior surface 97 of the housing. The interior surface 97 of the housing may also be covered with brake shoe or clutch lining-type material or surface treated to create a desired frictional contact between the outer surface of rollers 92 or surface portions of tires 92B and the interior surface 97 of the housing. Friction modifier elements may also be used on the surfaces.

The mating effect between the rollers with or without tires 92B, and the housing interior surface 97 is such that the coefficient of friction between them increases rapidly after a certain pressure is obtained, thus locking (preventing) the gear assembly from turning rearwardly. When the force on the rollers is reduced (by turning hand rim 14 backwards) below a certain point, the rollers 92—92 slide rearwardly on housing surface 97, thus allowing backward motion. As soon as the rearward speed of the wheel begins to drive the hand rim 14, however, the roller pressure increases and the wheelchair wheels lock again. The user thus must maintain continuous rearward movement of the wheel through application of rearward force on the hand rims, or the rollers 92—92 will lock the wheels.

Figure 8:
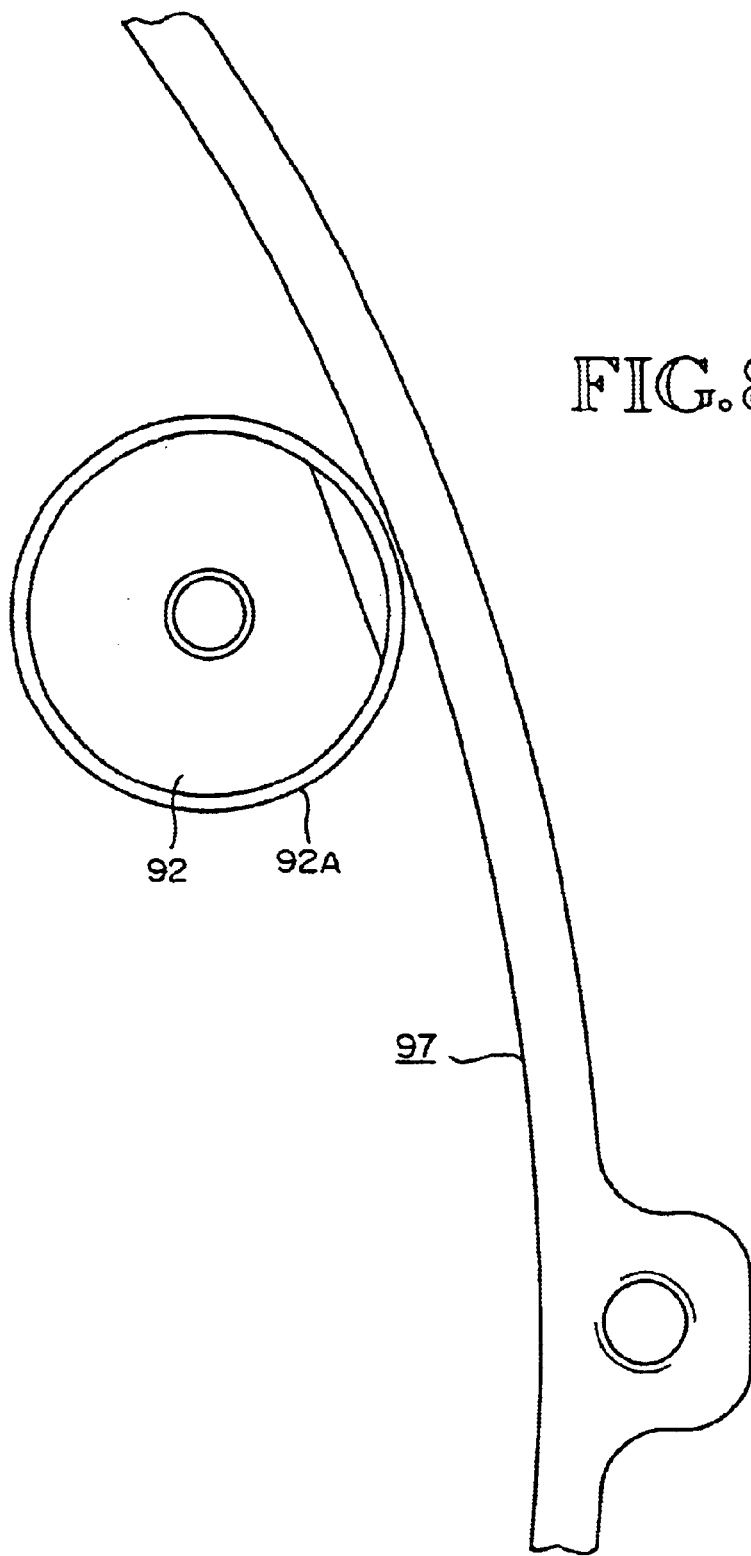
FIG. 8 is a front view showing the contact between two portions of the wheel assembly which produces the "hold" function thereof.

The physical contact between the roller assemblies 92 and the interior surface 97 of the housing is shown in FIG. 8. This arrangement has the remarkable effect of permitting the wheelchair to roll easily in the forward direction but to prevent the wheelchair from moving rearwardly, unless the hand rim 14 is moved physically backward by the user.

Basically, when the gearing assembly is in its lower, less than 1:1 gear (hypocycloidal) arrangement and there is a load on the hypocycloidal gearing, such as when the wheelchair is going uphill, a combined gear separation force and hypocycloidal restraint inward force resulting on spur gear 76 forces or jams the roller surfaces into the interior surface 97 of housing 18, with this force being proportional to the load on the gears. When going uphill, the user can thus let go of the hand rims and the wheelchair will remain locked in position (it will not roll back down the hill). The higher the torque on the wheels in the rearward direction due to the steepness of the hill or the user's weight, the greater the frictional locking effect between the rollers 92—92 and the housing.

However, as discussed above, the user is able to overcome this holding frictional force by physically rotating the hand rims in the reverse direction to reduce the gear load and the frictional load on the rollers, allowing them to slide backward along the inside surface of the housing, even though the roller clutches are locked. Hence, when it is desired to move the wheelchair in reverse, such as spinning around on a hill, the user rotates the hand rims in a reverse direction, which requires relatively little effort, and the housing will simply slide over the surface of the roller assemblies 92. Again, however, when the user does not rotate hand rim 14 fast enough, the entire wheelchair is securely locked in position by the frictional contact between the rollers and the housing, due to the hypocycloidal gearing and restraint system. This is a tremendous advantage for wheelchair users in maneuvering inclined surfaces.

In addition, it has been discovered that the hypocycloidal arrangement and the frictional contact of rubbing elements 95—95 against an interior surface of the housing increases the braking effect applied by the user's hands on the hand rims for declines (downhill surfaces). When the user restrains the wheelchair from moving downhill by applying an inward (toward the chassis) force on the hand rim, slowing the rotation thereof, the hypocycloidal gearing and the added friction of rubbing parts 95—95 against an interior surface of housing 18 increases the restraining (frictional) force applied to the hand rim by the user, so that the braking force required and any heat build-up between the user's hand and the surface of the hand rim as the hand rim surface moves across the user's hand is much less for the user, thereby reducing or preventing hand burning or the need for protective gloves.

When a user applies stopping force to the surface of the hand rim, that force typically has two components, one being the hand friction component directly against the outer surface of the hand rim, the second being the normal force of the hand pushing the hand rim inward toward the wheelchair chassis. The added friction inside the hypocycloidal gearing arrangement is the result of this normal force, producing a twisting force on the spoked drive wheel 16 and the housing 18 and increasing frictional contact between the rubbing pads 95 on cage plate 88 and the housing.

This normal force is much higher than when the user is driving the wheelchair forward, because there is no tendency to move the hand rims inwardly (in the direction of the wheelchair chassis) when the user's hand squeezes the outer peripheral surface of the hand rim to push it forward. The effect of the friction from the internal braking action described above is also increased by the lower gear ratio action, which increases the hand braking significantly and gives the user a sense of the braking action being power assisted.

This normal force component of the hand friction action to produce an internal braking action is unique to the two-speed hypocycloidal drive in the lower gear ratio only. When the gear assembly is in the 1:1 gear ratio, there is no power braking effect, as there is no friction between the housing and the rubbing parts.

The enhanced braking effect can be increased even further by mounting rubber or ceramic bicycle-type brake shoes on the insides of the tips of the spoked drive wheel 16 and the outboard surface of the tire rim. When the inward directed force of hand braking is applied to the hand rim, the spokes in drive wheel 16 bend slightly inwardly toward the chassis of the wheelchair, such that the brake shoes rub on the tire rim and create additional friction, which is also increased by the hypocycloidal gearing when the gear assembly is in the lower gear ratio.

Hence, the two-speed manual wheelchair wheel of the present invention has substantial operating advantages on hilly terrain over conventional manual wheelchairs.

FIGS. 9 and 10 show another feature of the wheel assembly of the present invention, in particular a quick-release capability. FIG. 9 shows a wheel mounting bracket 28 which is standard on many wheelchairs and is fixedly secured to the frame of the wheelchair by four screws (not shown), through openings at the corners thereof, or by similar means. Positioned in a lateral opening 124 in mounting bracket 28 is an axle-receiving member 126, which is secured to and extends through mounting bracket 28 with such an arrangement as to allow fore and aft adjustment of the wheelchair wheel, for balance purposes. Axle-receiving member 126 includes a longitudinal opening therethrough through which axle 102 from the wheel assembly extends. Axle receiving member 126 is standard on wheelchairs with quick-disconnect wheels and allows the wheelchair wheel of the present invention to be conveniently used on a large number of existing wheelchairs.

As indicated above, referring now to FIG. 9A, axle hub 98 is mounted on axle 102. Connected by screws (not shown) or the like to the inner end of axle hub 98 is an assembly 26, which includes a positioning cylinder 105 which extends parallel with axle 102. Positioning cylinder 102 is long enough to allow axle receiving bushing 127 to be adjusted in or out so that the free end of the positioning cylinder 102 always engages slot 124. The inner end of hub 98 and the corresponding portion of assembly 26 are configured to fit over a front nut portion 109 of axle-receiving member 126.

When the wheel assembly is installed on the wheelchair, axle 102 extends through opening 128 in the axle-receiving member 126, while positioning cylinder 105 extends through an unused part of open portion of lateral opening 124. This arrangement prevents hub 98 from rotating, as well as allowing adjustment of the wheel assembly relative to the mounting bracket 28.

Extending through the center of axle 102 is an elongated, spring-loaded cylinder 110. Disc 106 (FIG. 5) is connected to an outboard end 111 of cylinder 110, while the inboard end extends all the way through hollow axle 102, to the inboard end of axle 102. Axle 102 is ordinarily prevented from moving longitudinally relative to mounting bracket 28 by means of a ball detent arrangement 134. When the longitudinal cylinder 110 is pushed inwardly, however, the spring pressure on the ball detent is released, allowing the entire axle, along with the axle hub and the wheel assembly mounted thereto, to be removed from the support assembly and the axle-receiving member 126.

When the quick-release wheel assembly, on the other hand, is to be placed on the wheel chair, axle 102 of the wheel assembly is simply inserted into the axle-receiving member 126, while button 80 (FIG. 6) is being pushed, so that the ball detent member can move inwardly until the end of axle 102 clears the inboard end of member 126. At this point, button 80 is released and the ball detent members move to their outboard (outward) position, preventing the axle from being removed until the longitudinal member is pushed inboard by button 80, which releases the ball detent members as described above.

If the mounting bracket 28 shown in FIG. 9A is not present on a particular wheelchair, an adapter plate 113 shown in FIG. 9B is added to the wheelchair chassis to engage the positioning cylinder 105 in one of the openings 113A to prevent rotation of the inner wheel hub 98. Other specialized adapters may be required for other quick-release chassis mounting arrangements. A bolt-on axle with anti-rotation adapters (if required) can be used for wheelchairs without quick-release axles.

As discussed above, cylindrical button 80 (FIG. 6) extends from disc 106 through the center of spur gear 76 and outward through the hollow guide shaft 82. Pushing inwardly on cylindrical button 80 results in disc 106 being forced inwardly, in turn forcing longitudinal element 110 inwardly, thereby releasing the ball detent members 134. When disc 106 is maintained in this inward position, the axle can be readily moved into and removed from the wheelchair. This is the quick-release wheelchair action.

Figure 10A:
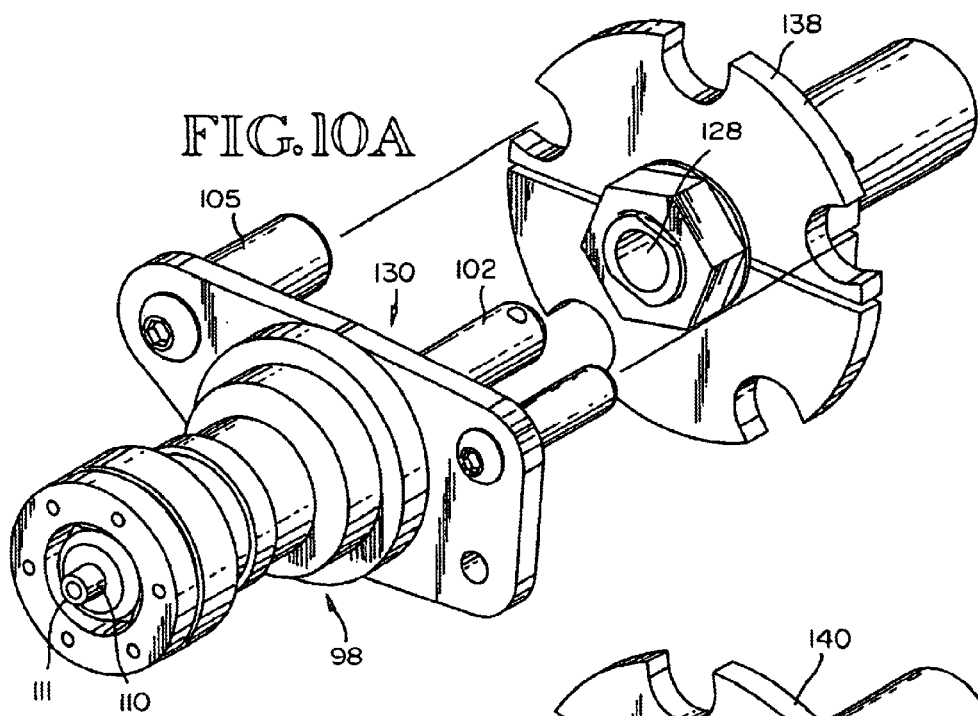
FIGS. 10A and 10B are exploded perspective views showing a quick-disconnect multi-speed wheel attachment mechanism which differentiates a right side wheel from a left side wheel.
Figure 10B:
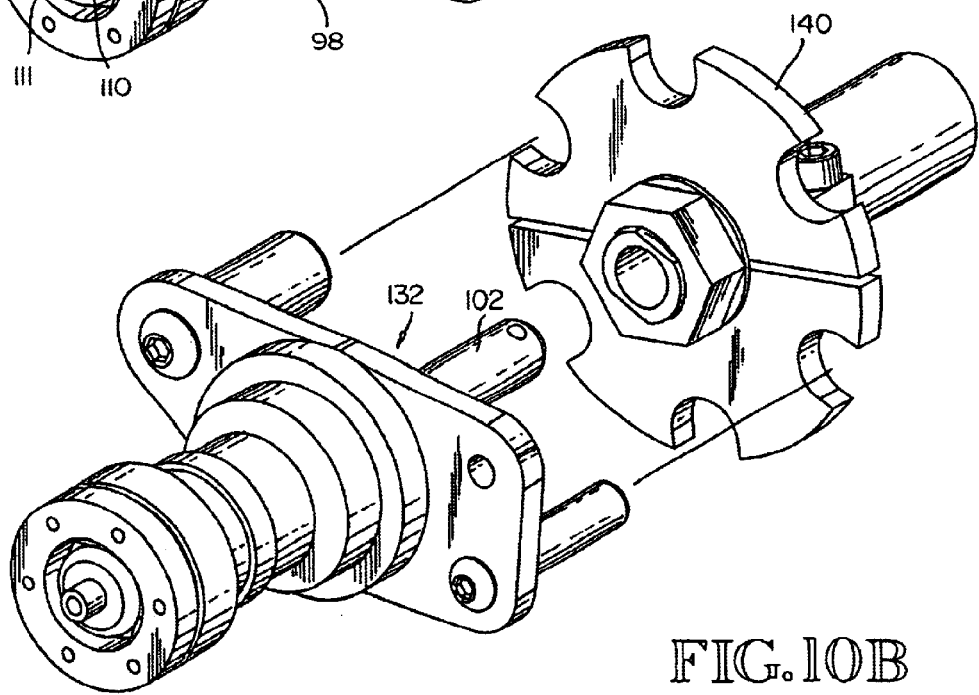

FIGS. 10A and 10B show an arrangement involving a particular wheelchair mounting bracket with the positioning member attached to the axle hub of the wheelchair assembly which differentiates the right wheel from the left wheel. The positioning plates of FIGS. 10A and 10B differ in the arrangement of two cylindrical positioning elements on, respectively, mounting assemblies 130, 132 with corresponding axle-receiving and support members 138, 140. One arrangement could be used for the left wheel; one could be used for the right wheel. Use of these two arrangements would make it impossible for a left-hand wheel to be positioned in a right-hand axle mount and vice versa. Other physical arrangements, of course, can be utilized to ensure that the correct wheels are positioned on the correct side of the wheelchair.

Alternative arrangements include various mounting configurations in combination with corresponding positioning members on the wheel assembly, which are unique to each side, including the angular position of the respective positioning members, the number of such members and other arrangements, so as to provide unique mounting characteristics for each side.

Accordingly, a new wheelchair wheel assembly has been disclosed. The wheel assembly includes a number of specific features, including a new gearing arrangement, a new physical structure which links the hand rim to the wheelchair wheel and an arrangement by which a "hold" function is obtained for inclined surfaces in which the wheelchair is prevented from moving in the reverse direction while at the same time permitting the wheelchair to be moved in a reverse direction by the user working the hand rims in the reverse direction. In addition, an increased braking force is obtained for decline(downhill) surfaces, when the wheelchair is in its lower gear ratio, with the user having the frictional force applied to the hand rim increased by friction produced with the gear assembly structure to provide an increased braking force. In addition, a quick-release wheel structure has been disclosed which results in the entire wheel assembly being quickly and efficiently removed from or inserted onto the wheelchair.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A two-speed drive mechanism for a wheelchair, comprising:
    a wheelchair wheel;
    a hand rim to drive the wheelchair wheel;
    a gear assembly which includes a first gear arrangement for driving the wheelchair in a first, 1:1 gear ratio and a second gear arrangement comprising a ring gear and a single spur gear in which the spur gear orbits about an eccentric axis, engaging the ring gear in a hypocycloidal relationship for driving the wheelchair in a second, lower gear ratio;
    a support assembly for mechanically linking the hand rim and the gear assembly; and
    means for shifting between the two gear arrangements.

2. A mechanism of claim 1, wherein the first gear ratio is 1:1 and the second gear ratio is lower than 2:1.

3. A mechanism of claim 1, wherein the shifting means moves in a planar direction, perpendicular to an axle for the wheel, to accomplish shifting between the two gear arrangements.

4. A mechanism of claim 1, wherein the gear assembly includes a first gear plate having the ring gear defined therein and a gear segment mounted to a shift member in the support assembly which moves between two positions, the gear segment engaging the ring gear and driving the ring gear and said first gear plate in the first, 1:1 gear ratio when the shift member is in a first position, the gear assembly further including the spur gear being non-rotatably mounted on a restraining plate, the restraining plate in operation orbiting with the spur gear, the spur gear engaging the ring gear in said hypocycloidal relationship and driving the ring gear and the first gear plate in the second, lower gear ratio when the shift member is in a second position.

5. A mechanism of claim 3, including portions on opposing surfaces of the shift member which are differentiated from each other in a tactile manner, so that the user can readily determine which portion to use to shift the gear assembly from one gear ratio to the other gear ratio.

6. A mechanism of claim 5, wherein one portion has a smooth edge and the other portion a wavy edge.

7. A mechanism of claim 4, wherein the second gear arrangement includes a fixed plate having a plurality of circular openings spaced around the face thereof, wherein the restraining plate includes a plurality of roller elements which extend inboard from a surface thereof and which engage the circular openings in the fixed plate, so that as the hand rim is rotated by the user, the shift member rotates, the spur gear moves in a non-rotating hypocycloidal relationship with the ring gear, driving the ring gear and in turn the wheelchair wheel.

8. A mechanism of claim 4, including a second gear plate having the same outside diameter as the first gear plate and positioned inwardly toward the wheel, the first and second gear plates being joined by a plurality of one-direction roller elements having non-rotating central shafts therein, around the periphery thereof, the roller elements permitting rolling movement in one rotational direction but not the other, and wherein the support assembly includes a housing in which the shift member is mounted and into which the gear mechanism is mounted, the housing being arranged so that an exterior surface of the roller elements frictionally engage an interior surface of the housing, in such a manner that when the spur gear is engaged and moving in a hypocycloidal pattern, the wheelchair wheel is free to roll in the forward rotational direction but is prevented from moving in the reverse direction due to unbalanced hypocycloidal gear and restraint loads, unless a user moves the hand rim in the reverse direction to reduce the gear and restraint loads and allow sliding of the roller elements relative to said interior surface of the housing.

9. A mechanism of claim 8, wherein a portion of the user's braking force on the hand rim produces a frictional effect between the interior surface of the housing and a number of friction elements within the housing, such frictional effect assisting in the braking action for the wheelchair.

10. A mechanism of claim 8, further including brake elements positioned between the hand rim and a rim of the wheel, the brake elements meeting together and compressing in response to an inwardly directed portion of the user's braking force.

11. A mechanism of claim 1, wherein the mechanism is mounted on an axle having a quick-release capability relative to the wheelchair.

12. A mechanism of claim 1, wherein the wheelchair must be stopped before the shifting means can be operated.

13. A multi-speed drive mechanism for a manual wheelchair, wherein the drive mechanism can be shifted by a user while sitting in the wheelchair, comprising:
    a wheelchair wheel;
    a hand rim to drive the wheelchair wheel;

a gear assembly which includes a first gear arrangement for driving a wheelchair in a first gear ratio and a second gear arrangement for driving the wheelchair in a second gear ratio;

a linking structure which connects the hand rim to the gear assembly; and means mounted on the linking structure for shifting between the two gear arrangements, wherein the shifting means moves in a planar direction, perpendicular to an axle for the wheel, moving the first and second gear arrangements perpendicular to the axle to accomplish said shifting.

14. A mechanism of claim 13, wherein the first gear ratio is 1:1 and the second gear ratio is lower than 1:1.

15. A mechanism of claim 13, wherein the shifting means includes a shift member which moves between first and second positions, wherein in the first position, the first gear arrangement is engaged, which results in the wheelchair being in the first gear ratio, and wherein in the second position, the second gear arrangement is engaged, which results in the wheelchair being in the second gear ratio.

16. A mechanism of claim 13, including first and second locking elements on opposing portions of a shift member part of the shifting means, wherein when the shift member is in one of the first and second positions, a first locking element can be released to permit the shift member to be moved to the other position.

17. A mechanism of claim 13, wherein the gear assembly is arranged such that the wheelchair must be stopped and the gear assembly unloaded before the shifting means can be operated, wherein the hand rim remains connected to the drive wheel during shifting between the two gear arrangements.

18. A multi-speed drive mechanism for a wheelchair comprising:

a wheelchair wheel;

a hand rim to drive the wheelchair wheel;

a gear assembly which includes a first gear arrangement for driving the wheelchair in a first gear ratio and a second arrangement for driving the wheelchair in a second, lower gear ratio;

a support assembly for mechanically linking the hand rim and the gear assembly; and means for shifting between the two gear arrangements, wherein the shifting means includes a shift member used to shift between said first and second gear ratios, the shift member having at least two portions which are differentiated from each other in a tactile manner, wherein one portion is associated with the first gear ratio and the other portion is associated with the second gear ratio.

19. A mechanism of claim 18, wherein the two portions are differentiated from each other by configuration.

20. A mechanism of claim 18, wherein one portion has a smooth contact section which is associated with a gear ratio suitable for a flat terrain and wherein the other portion has a wavy contact section which is associated with a gear ration suitable for an inclining/declining terrain.

21. A mechanism of claim 19, wherein the two portions can be distinguished by a user wearing gloves.

22. A wheel assembly for a manual wheelchair, comprising:

a wheelchair wheel;

a hand rim to drive the wheelchair wheel;

a housing assembly connected to the hand rim;

a cage assembly fixedly secured to the wheel, the cage assembly including two spaced cage plates and a plurality of single-direction rollers extending therebetween around the periphery thereof, permitting rolling movement in one rotational direction but not the other direction, wherein the inner cage assembly is mounted within the housing such that the rollers contact the inner surface of the housing and wherein a frictional locking force is created between the rollers and the housing that increases as the torque on the wheel increases when the wheelchair is traversing an incline, but such that the housing can be rotated in the reverse direction by a user's use of the hand rim, which results in a sliding action between the rollers and the housing; and a gear assembly linking the housing assembly to the cage assembly, such that as the hand rim is rotated, the wheel rotates therewith.

23. An assembly of claim 22, wherein the rollers include at least three spaced rollers, and wherein the rollers have an outer surface and the housing has an interior surface with at least one selected physical characteristic which increases the coefficient of friction between the rollers and the housing sufficiently to generally prevent rolling movement of the rollers in said other rotational direction.

24. An assembly of claim 23, wherein the selected physical characteristic for the rollers and the housing is a selected material which increases the coefficient of friction therebetween.

25. An assembly of claim 22, wherein the gear assembly includes a hypocycloidal gear arrangement which includes a ring gear in one of the cage members and a spur gear mounted so as to orbit within and engage the ring gear, without rotation of the spur gear, the spur gear following an eccentric path resulting in a hypocycloidal driving relationship between the spur gear and the ring gear.

26. An assembly of claim 22, wherein force on the hand rim that produces a direct stopping action on the hand rim causes frictional contact between (a) selected rubbing elements on the cage assembly and (b) said housing and if said force is inwardly directed, between selected rubbing elements on (c) the hand rim and (d) the wheel, both of which increase the stopping action on a declining surface.

27. A quick-release wheel assembly for a wheelchair, comprising:

a wheel assembly, which includes a wheelchair wheel, a hand rim to drive the wheel and a support mechanism linking the hand rim and the wheel;

a hub assembly on which the wheel assembly is mounted, the hub assembly including an axle which in turn includes a quick-release element which is spring actuated such that the axle fits into and is removed from a receiving member on the wheelchair when the spring-actuated element is in an actuated position and such that the axle is locked into the receiving member when the spring-actuated element is in a non-actuated position; and a positioning member mounted to an inboard end of the hub assembly, the positioning member having a center line which is offset from the center line of the axle by a distance greater than the radius of the axle and such that the exterior surface of the positioning, member clears the exterior surface of the axle, the positioning member extending into and captured by a non-rotating portion of the receiving member on the wheelchair so that the hub assembly cannot rotate relative to the receiving member and hence the wheelchair.

28. An assembly of claim 27, wherein the quick-release element includes a ball detent near an inboard end of the axle and a spring-loaded cylinder which extends through the axle and interacts with the ball detent such that when the cylinder is moved into a first position against the action of the spring, the ball detent element can be moved inwardly for release of the wheel assembly from the wheelchair and such that when the cylinder is in a second position, the ball detent prevents removal of the axle from the wheelchair.

29. An assembly of claim 27, wherein the positioning member and the receiving member are different in configuration for the left and right-hand wheels on a wheelchair, such that the left-hand wheel can be mounted only on the left side of the wheelchair and the right wheel can be mounted only on the right side of the wheelchair.

30. An assembly of claim 27, wherein said positioning member is located at least one inch from the centerline of the axle.

31. A mechanism of claim 12, wherein the shifting means engages one of the gear arrangements for driving the wheelchair before disengaging the other gear arrangement.

32. A mechanism of claim 17, wherein the shifting means engages one of the gear arrangements for driving the wheelchair before disengaging the other gear arrangement.

* * * * *